(12) United States Patent
Choi et al.

(10) Patent No.: US 11,600,841 B2
(45) Date of Patent: Mar. 7, 2023

(54) SEPARATOR ASSEMBLY FOR FUEL CELL AND FUEL CELL STACK INCLUDING SAME

(71) Applicants: Hyundai Motor Company, Seoul (KR); Kia Motors Corporation, Seoul (KR)

(72) Inventors: Jae Hyeon Choi, Yongin-si (KR); Woo Chul Shin, Goyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 246 days.

(21) Appl. No.: 17/183,681

(22) Filed: Feb. 24, 2021

(65) Prior Publication Data

US 2022/0131172 A1 Apr. 28, 2022

(30) Foreign Application Priority Data

Oct. 27, 2020 (KR) .................. 10-2020-0140625

(51) Int. Cl.
*H01M 8/248* (2016.01)
*H01M 8/0247* (2016.01)

(52) U.S. Cl.
CPC ......... *H01M 8/248* (2013.01); *H01M 8/0247* (2013.01)

(58) Field of Classification Search
CPC .. H01M 8/248; H01M 8/0247; H01M 8/0202; H01M 8/2465; H01M 8/04164; H01M 8/2457; H01M 8/0297; H01M 8/0258; H01M 8/241; Y02E 60/50
See application file for complete search history.

(56) References Cited

U.S. PATENT DOCUMENTS

2012/0270131 A1* 10/2012 Fukuta ................ H01M 8/2457
429/454

FOREIGN PATENT DOCUMENTS

| JP | 2008-123760 | * | 5/2008 | ............. H01M 8/24 |
| KP | 100783423 | * | 12/2007 | ............. H01M 8/02 |
| KR | 100783423 B1 | | 12/2007 | |

* cited by examiner

*Primary Examiner* — Helen Oi K Conley
(74) *Attorney, Agent, or Firm* — Slater Matsil, LLP

(57) ABSTRACT

A separator assembly for a fuel cell includes a first separator having tunnel-shaped fastening parts formed on a plurality of points of an edge area thereof, and a second separator having insert parts formed at positions corresponding to each of the fastening parts of the first separator on an edge area thereof to be inserted into the fastening parts, wherein the insert parts of the second separator are inserted into the fastening parts of the first separator to assemble the first separator and the second separator.

20 Claims, 14 Drawing Sheets

"B"

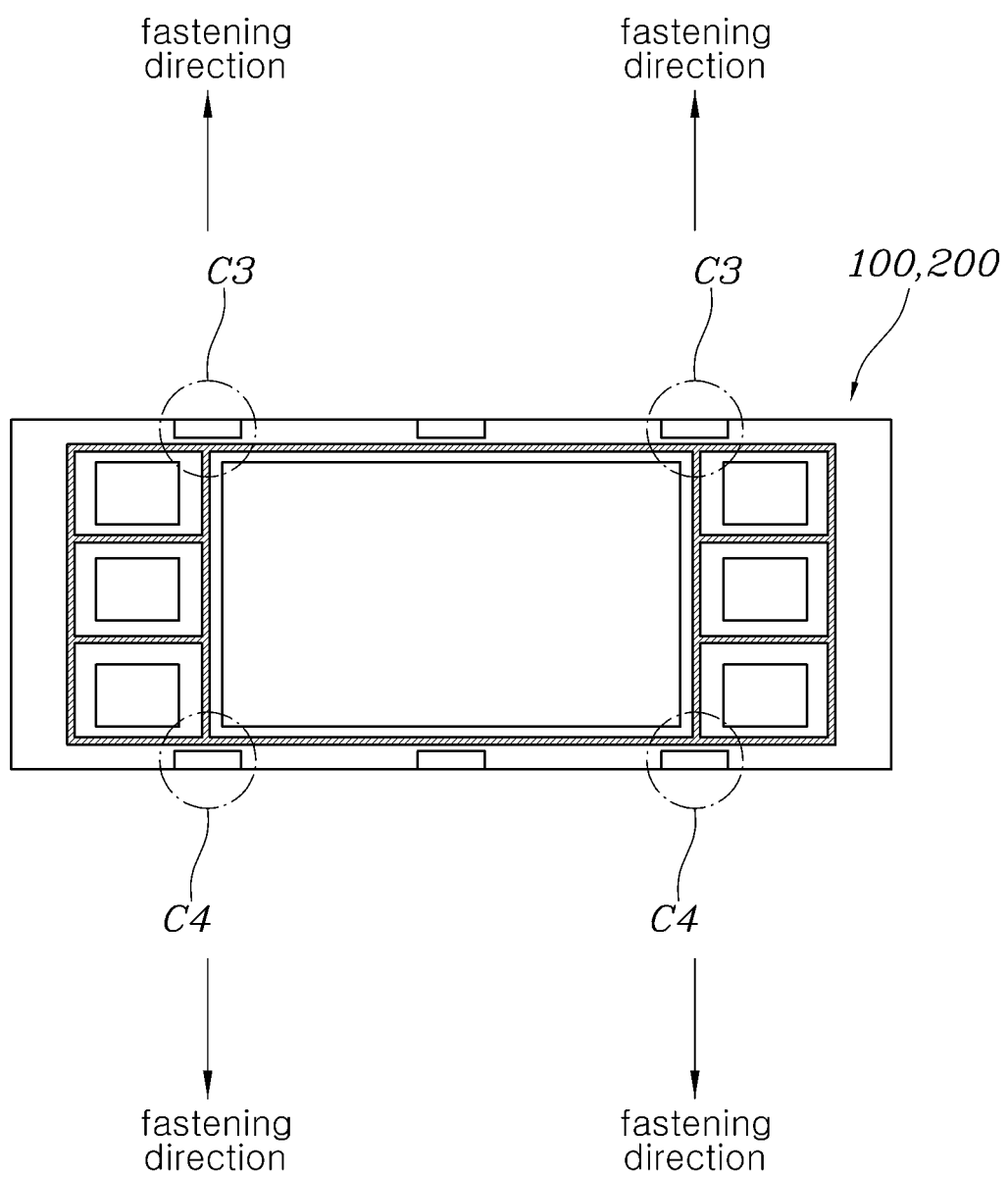

SEPARATOR ASSEMBLY FOR FUEL CELL AND FUEL CELL STACK INCLUDING SAME

CROSS-REFERENCE TO RELATED APPLICATIONS

This application claims the benefit of Korean Patent Application No. 10-2020-0140625, filed on Oct. 27, 2020, which application is hereby incorporated herein by reference.

TECHNICAL FIELD

The present invention relates to a separator assembly for a fuel cell and a fuel cell stack including the separator assembly.

BACKGROUND

A fuel cell is a kind of power generator that converts chemical energy of fuel into electric energy by electrochemically reacting the fuel in a stack. The fuel cell may not only supply driving power for industries, homes, and vehicles, but may also be used to supply power of a small electronic product such as a portable device. Recently, the use field of the fuel cell is being gradually expanded as a high-efficient clean energy source.

FIG. 1 is a diagram illustrating the configuration of a general fuel cell stack.

As shown in FIG. 1, the general fuel cell stack has a membrane electrode assembly in an innermost portion. The membrane electrode assembly 10 includes a polymer electrolyte membrane ii that may migrate protons, and catalyst layers, i.e. an anode 12 and a cathode 13, which are coated on both sides of the electrolyte membrane to allow hydrogen and oxygen to react with each other.

Furthermore, a pair of gas diffusion layers (GDLs) 20 is stacked on an outer portion of the membrane electrode assembly 10, i.e. an outer portion in which the anode 12 and the cathode 13 are located. A pair of separators 30 defining a flow field is located on the outer portions of the gas diffusion layers 20 to supply fuel and discharge water produced by a reaction with a gasket 40 being interposed therebetween. An end plate 50 is coupled to the outermost portion to fixedly support the above-described components.

Here, the pair of separators 30 includes an anode separator 31 disposed on the anode, and a cathode separator 32 disposed on the cathode.

Meanwhile, the fuel cell stack is made by stacking multiple unit cells. Here, the anode separator 31 disposed on any one unit cell and the cathode separator 32 disposed on an adjacent unit cell are stacked to face each other.

Thus, in order to smoothly perform the process of stacking unit cells and maintain the alignment of the unit cells, the cathode separator 32 and the anode separator 31 of the adjacent unit cells, which are disposed to face each other, are integrated and then the unit cells are stacked.

FIG. 2 is a diagram illustrating conventional separators which are integrated by welding.

As shown in FIG. 2, the conventional separator 30 includes on a central area thereof a reaction surface on which a membrane electrode assembly is disposed, with a plurality of inlet manifolds and outlet manifolds being formed on opposite areas of the reaction surface. Here, in order to seal the reaction surface, the inlet manifolds, and the outlet manifolds, an area in which the reaction surface, the inlet manifolds, and the outlet manifolds are formed is surrounded by the gasket 40.

Meanwhile, a method of integrating the anode separator 31 and the cathode separator 32 of the adjacent unit cells adopts a method of spot-welding predetermined points on edge areas of the anode separator 31 and the cathode separator 32 that face each other. Here, points where they are welded are denoted by welding points W.

FIG. 3 is an enlarged view illustrating portion "A" of FIG. 2.

As shown in FIG. 3, when the pair of separators 30, i.e. the anode separator 31 and the cathode separator 32 face each other, edges are spaced apart from each other by flow fields formed in the respective separators.

However, welding surfaces should be in close contact with each other, due to the characteristics of spot welding. Thus, in order to spot-weld the anode separator 31 and the cathode separator 32, a welding surface 32a is bent to make the welding point of the cathode separator 32 come into contact with the anode separator 31.

Furthermore, since it is important to eliminate metal burrs which are inevitably generated in the process of manufacturing the anode separator 31 and the cathode separator 32, a lot of time and cost are invested in managing a trimming process, and a washing process should be essentially performed before welding.

In addition, a spring-back phenomenon occurs in the anode separator 31 and the cathode separator 32 due to the characteristics of a press process. The unavoidable spring-back phenomenon increases the defective contact of the welding surface 32a.

Thus, in the process of joining the anode separator 31 and the cathode separator 32, a poor welding-surface contact phenomenon caused by the phenomenon such as metal burrs or spring back becomes a major factor in reducing the yield of the separator.

Furthermore, the welding is a technology that applies the principle of locally melting and attaching metal. Thus, when both a welding strength and a position are not adjusted, a phenomenon where a hole is formed in a corresponding portion due to the melting of the metal may occur. This causes poor air-tightness in the flow field of hydrogen, air, and coolant, which are mainly treated by the separator.

The foregoing is intended merely to aid in the understanding of the background of the present invention, and is not intended to mean that the present invention falls within the purview of the related art that is already known to those skilled in the art.

SUMMARY

The present invention relates to a separator assembly for a fuel cell and a fuel cell stack including the separator assembly. Particular embodiments relate to a separator assembly for a fuel cell fastened in a mechanical structure and a fuel cell stack including the separator assembly.

Accordingly, embodiments of the present invention has been made keeping in mind problems occurring in the related art, and embodiments of the present invention provide a separator assembly for a fuel cell fastened in a mechanical structure and a fuel cell stack including the separator assembly.

An embodiment of the present invention provides a separator assembly for a fuel cell including a pair of separators, the separator assembly including a first separator having tunnel-shaped fastening parts formed on a plurality of points of an edge area thereof, and a second separator having an insert part formed at a position corresponding to each of the fastening parts of the first separator on an edge area thereof to be inserted into the fastening part, wherein the insert part of the second separator may be inserted into the fastening part of the first separator to assemble the first separator and the second separator.

The fastening part of the first separator may protrude to be bent in a direction facing the second separator, and at least one of opposite ends of the fastening part may be opened to form an entrance.

The insert part of the second separator may protrude to be bent in a direction facing the first separator, and may extend to be inserted into the entrance.

The fastening part of the first separator may be formed along a major axis of the first separator, so that a pair of entrances may be formed on opposite ends along the major axis, and the pair of entrances may communicate with each other.

The insert part of the second separator may be formed along a major axis of the second separator, so that a first end with respect to the major axis has an extension part that is bent while extending integrally with a main body of the second separator, and a second end has a spacing part that is spaced apart from the main body of the second separator, and thereby the insert part may be inserted into the entrance of the fastening part through the spacing part.

The fastening part of the first separator may be formed along a minor axis of the first separator, so that a pair of entrances may be formed on opposite ends along the minor axis, and the pair of entrances may communicate with each other.

The insert part of the second separator may be formed along a minor axis of the second separator, so that a first end with respect to the minor axis may have an extension part that is bent while extending integrally with a main body of the second separator, and a second end may have a spacing part that is spaced apart from the main body of the second separator, and thereby the insert part may be inserted into the entrance of the fastening part through the spacing part.

The fastening part of the first separator may be formed on each of at least two points of opposite edges with respect to the minor axis of the first separator, and the insert part of the second separator may be formed to correspond to a point where the fastening part is formed.

Insert parts inserted into the fastening parts on the same major axis may be arranged in the same direction.

Insert parts inserted into the fastening parts on the same major axis may be arranged in opposite directions.

Insert parts inserted into the fastening parts on the same minor axis may be arranged in the same direction.

Insert parts inserted into the fastening parts on the same minor axis may be arranged in opposite directions.

An embodiment of the present invention provides a fuel cell stack formed by stacking a plurality of fuel cells each including a membrane electrode assembly, a pair of gas diffusion layers, a first separator and a second separator, wherein tunnel-shaped fastening parts may be formed in a plurality of points on an edge area of the first separator, insert parts may be formed at positions corresponding to the fastening parts of the first separator on an edge area of the second separator to be inserted into the fastening parts, and the insert parts of the second separator may be inserted into the fastening parts of the first separator to assemble the first separator and the second separator.

According to an embodiment of the present invention, a welding process itself is eliminated by applying a mechanical fastening method instead of a welding method in the process of assembling a pair of separators, thus reducing the cost of the process, solving the problem of ion elution in the separators due to welding, and addressing the problem of a reduction in durability due to corrosion resistance.

Furthermore, it is possible to reduce a defective rate in the process of stacking separators due to the poor welding of the separators, and thereby a reduction in defective rate of a fuel cell stack can also be expected.

BRIEF DESCRIPTION OF THE DRAWINGS

The above and other objectives, features, and other advantages of the present invention will be more clearly understood from the following detailed description when taken in conjunction with the accompanying drawings, in which:

FIGS. 13 and 14 are diagrams illustrating the fastening direction of the separator assembly for the fuel cell in accordance with another embodiment of the present invention.

DETAILED DESCRIPTION OF ILLUSTRATIVE EMBODIMENTS

Figure 1:
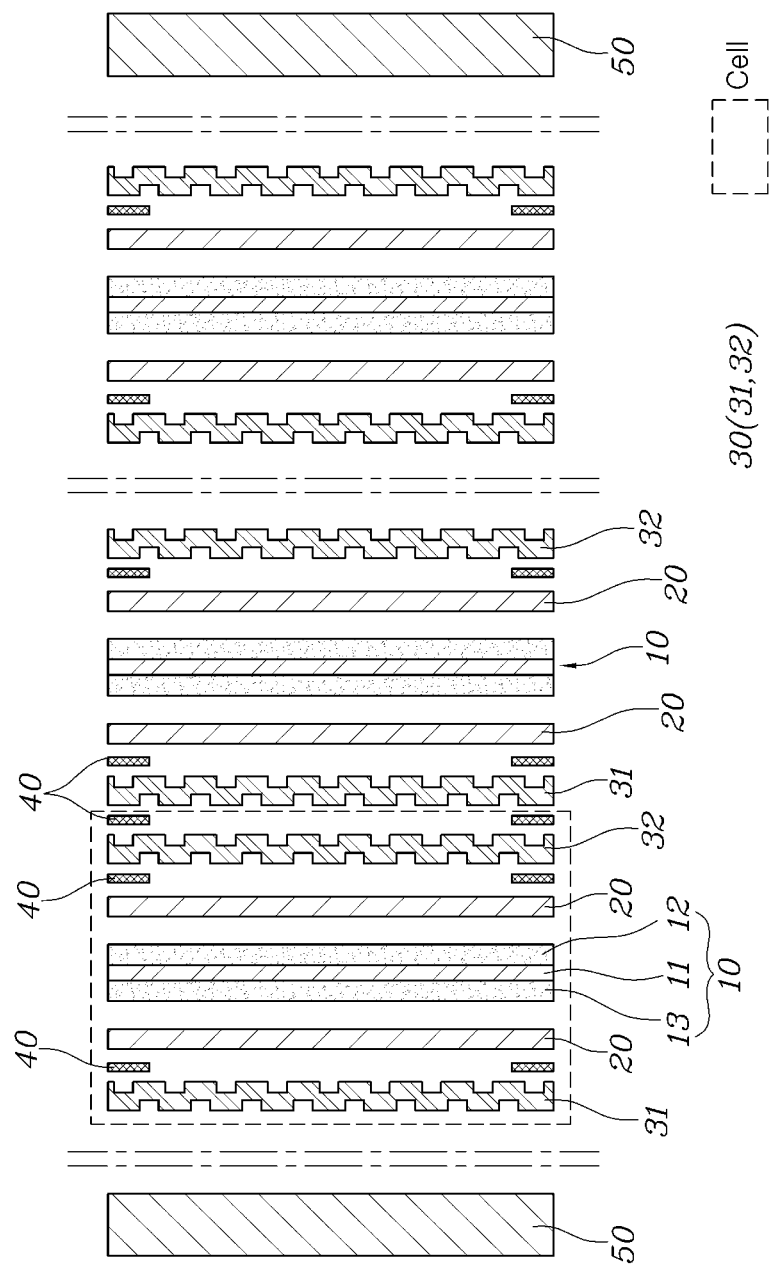
FIG. 1 is a diagram illustrating the configuration of a general fuel cell stack.
Figure 2:
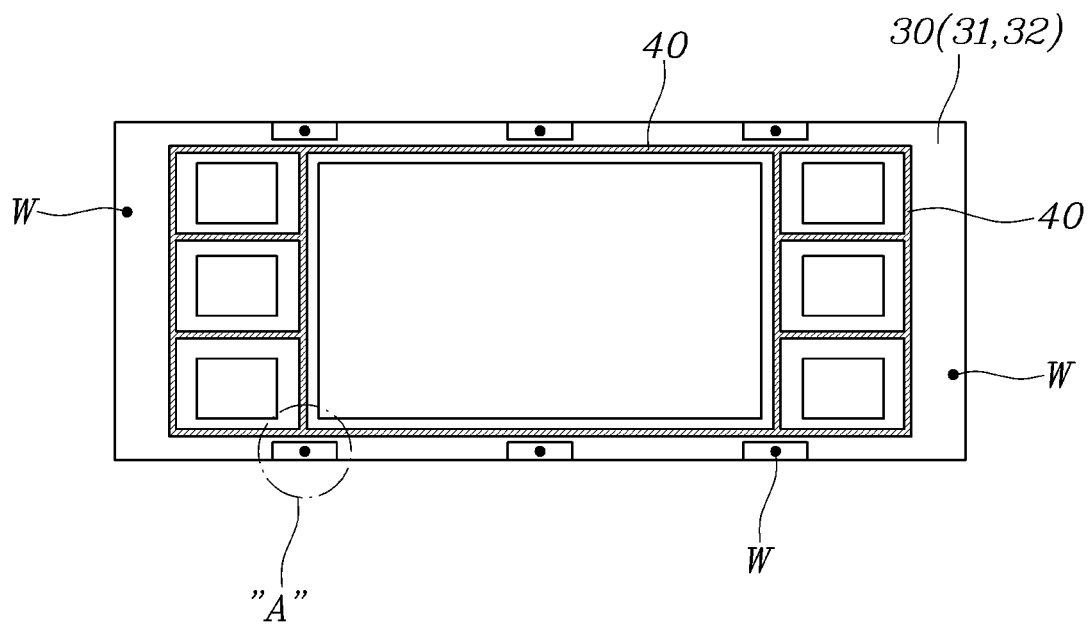
FIG. 2 is a diagram illustrating conventional separators which are integrated by welding.
Figure 3:
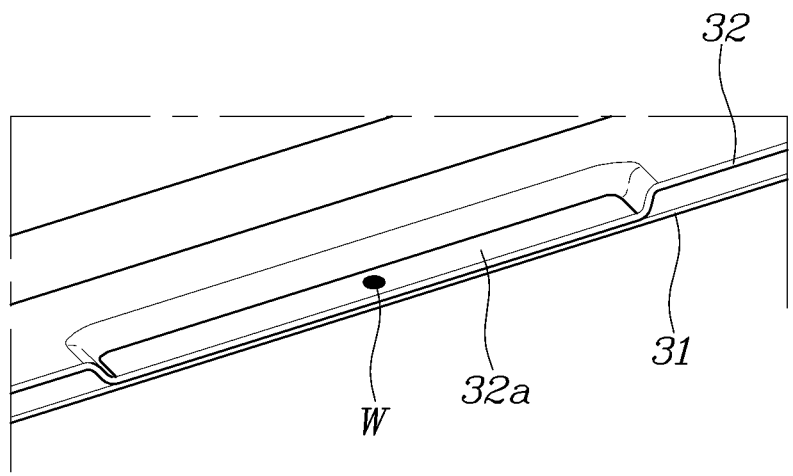
FIG. 3 is an enlarged view illustrating portion "A" of FIG. 2.

Hereinafter, exemplary embodiments of the present invention will be described in detail with reference to the accompanying drawings. However, the present invention may be implemented in various forms without being limited to embodiments that will be described below. These embodiments are intended to make the present invention complete, and are provided to completely convey the scope of the present invention to those skilled in the art. Like reference numerals denote like elements throughout the drawings.

A fuel cell stack according to an embodiment of the present invention is obtained by improving the structure and method of assembling separators that face each other while maintaining the configuration of the conventional fuel cell stack shown in FIG. 1. In addition, a fastening part and an insert part for mechanical fastening are formed, respectively, on a pair of facing separators of adjacent cells, and the insert part is fastened to the fastening part to assemble the pair of separators. Thus, the welding process for joining the pair of separators may be eliminated.

Therefore, as shown in FIG. 1, the fuel cell stack according to an embodiment of the present invention is made by connecting several unit cells in series. Each unit cell includes a membrane electrode assembly 10, a pair of gas diffusion layers 20, an anode separator 31 (hereinafter referred to as a "first separator 100"), and a cathode separator 32 (hereinafter referred to as a "second separator 200"). Thus, the first separator 100 formed on one cell and the second separator 200 formed on an adjacent cell are disposed to face each other. In this embodiment, the first separator 100 and the second separator 200 facing each other are assembled through a mechanical structure to be integrated with each other, thus forming a separator assembly.

In the separator assembly of embodiments of the present invention, if a fastening part 110 is formed on any one separator and an insert part 210 is formed on the other separator, their forming positions are not limited to the anode separator and the cathode separator.

Thus, among the pair of separators forming the separator assembly, the anode separator will be referred to as the first separator wo, and the cathode separator will be referred to as the second separator 200.

The separator assembly will be described in addition.

Figure 4:
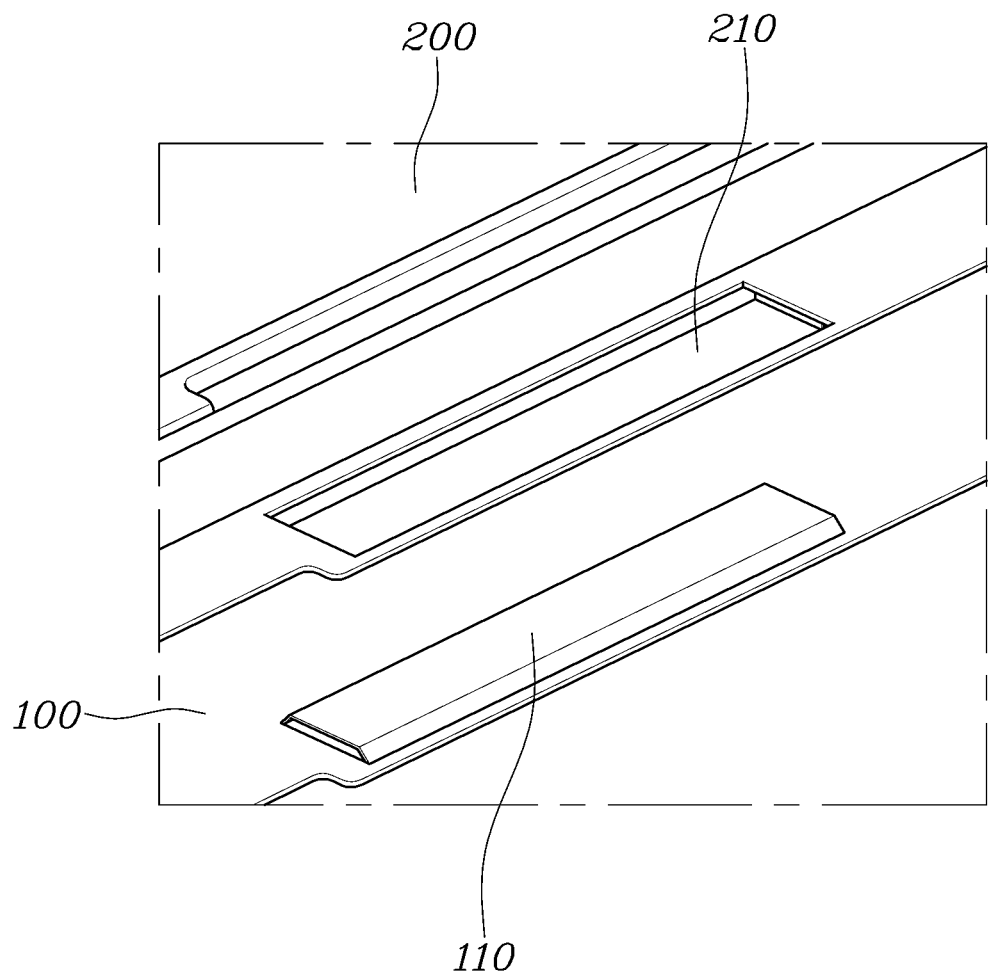
FIG. 4 is a diagram illustrating a separator assembly for a fuel cell in accordance with an embodiment of the present invention.
Figure 5:
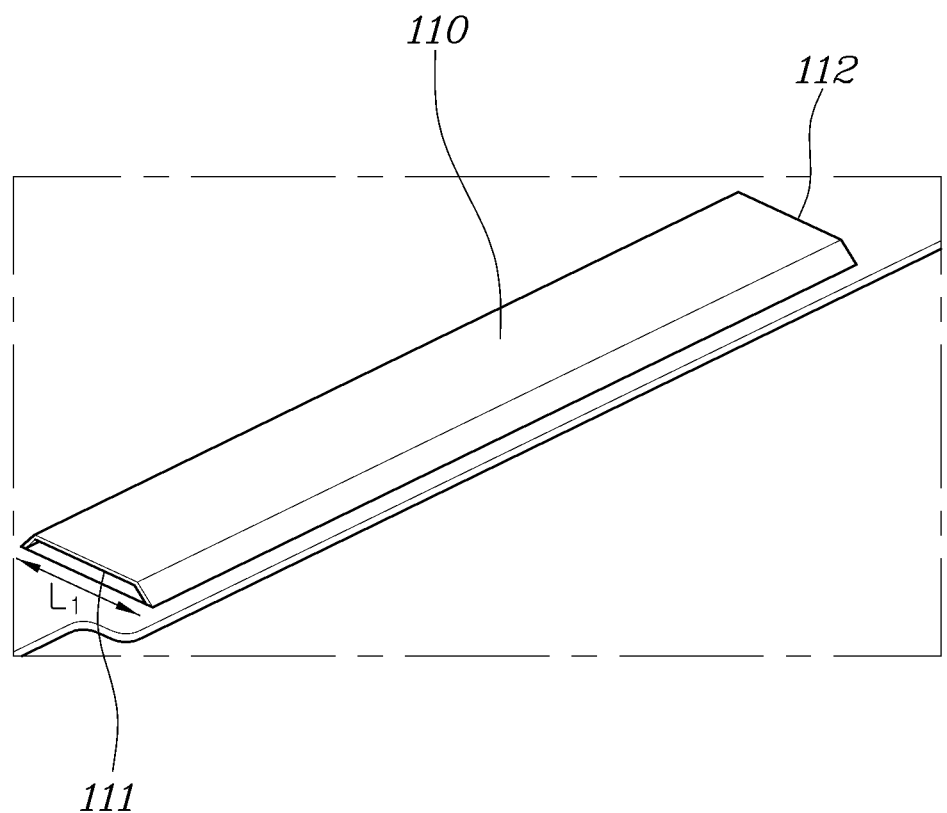
FIG. 5 is a diagram illustrating a first separator of the separator assembly for the fuel cell in accordance with an embodiment of the present invention.
Figure 6A:
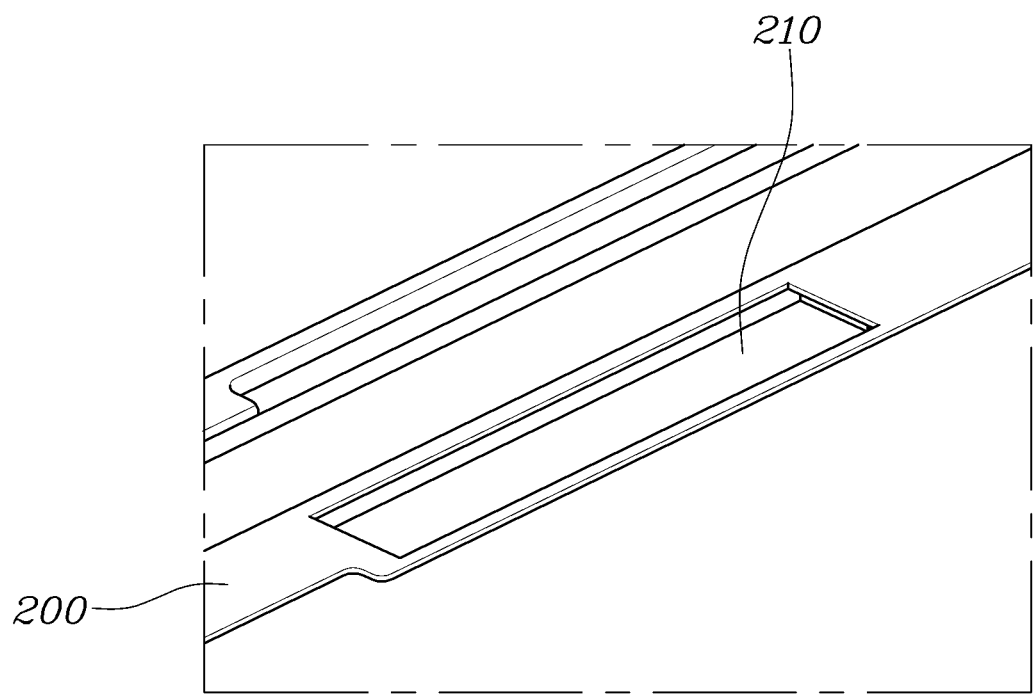
FIGS. 6A and 6B are diagrams illustrating a second separator of the separator assembly for the fuel cell in accordance with an embodiment of the present invention.
Figure 6B:
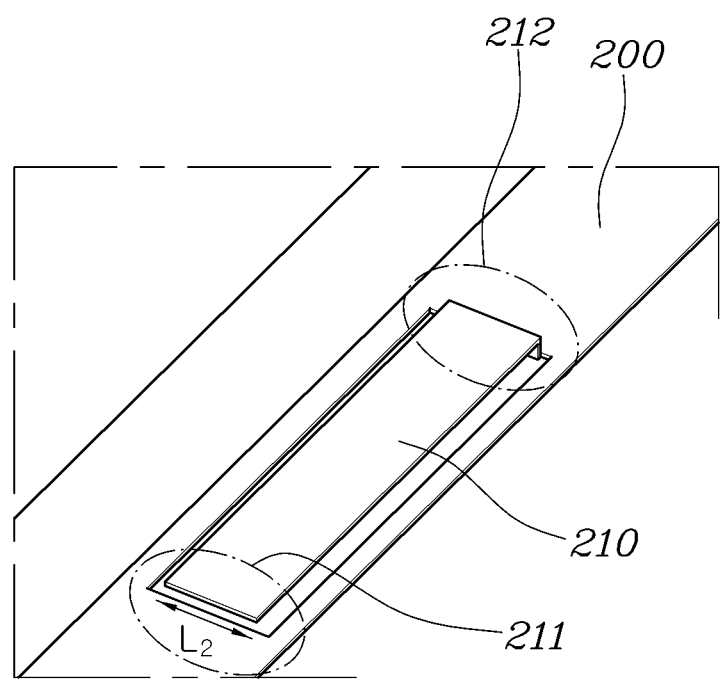

FIG. 4 is a diagram illustrating a separator assembly for a fuel cell in accordance with an embodiment of the present invention, FIG. 5 is a diagram illustrating a first separator of the separator assembly for the fuel cell in accordance with an embodiment of the present invention, and FIGS. 6A and 6B are diagrams illustrating a second separator of the separator assembly for the fuel cell in accordance with an embodiment of the present invention.

As shown in the drawings, the separator assembly for the fuel cell in accordance with an embodiment of the present invention includes a first separator wo having tunnel-shaped fastening parts 110 formed on a plurality of points of an edge area thereof, and a second separator 200 having insert parts 210 provided on positions corresponding to the fastening parts 110 of the first separator wo on the edge area to be inserted into the fastening parts 110. Thus, each insert part 210 of the second separator 200 is inserted into the corresponding fastening part 110 of the first separator 100 to assemble the first separator 100 and the second separator 200.

Here, each of the first separator 100 and the second separator 200 has on the central area thereof a reaction surface on which a membrane electrode assembly is disposed, and a plurality of inlet manifolds and outlet manifolds are formed on opposite sides of the reaction surface with respect to a major axis. Here, in order to seal the reaction surface, the inlet manifolds, and the outlet manifolds, an area where the reaction surface, the inlet manifolds, and the outlet manifolds are formed is surrounded by a gasket.

Furthermore, the reaction surface, the inlet manifolds, and the outlet manifolds of the first separator 100, and the reaction surface, the inlet manifolds, and the outlet manifolds of the second separator 200 are formed on corresponding positions.

The fastening part 110 formed on the first separator 100 protrudes to be bent in a direction facing the second separator 200, and at least one of opposite ends of the fastening part is opened to form an entrance 111 or 112. Thus, the fastening part 110 is formed in the shape of a tunnel that is opened at opposite ends thereof or at one end thereof. In this embodiment, the fastening part 110 formed on the first separator 100 is implemented in the shape of a tunnel that is opened at opposite ends thereof.

Here, one open end of the fastening part 110 formed on the first separator 100 is referred to as a first entrance 111, while the other open end of the fastening part 110 is referred to as a second entrance 112.

Furthermore, the fastening part 110 of the first separator 100 is formed along the major axis of the first separator 100, so that the first entrance 111 is formed on a first end along the major axis, and the second entrance 112 is formed on a second end. Thus, the first entrance 111 and the second entrance 112 communicate with each other.

Meanwhile, the cross-section of the fastening part 110 preferably has the shape of a parallelogram which is formed such that the length $L_2$ of a top side thereof is relatively short, the length $L_1$ of a bottom side thereof is relatively long, and the top side and the bottom side are parallel to each other ($L_1 > L_2$).

The insert part 210 formed on the second separator 200 protrudes to be bent in a direction facing the first separator 100, and extends to be inserted into the entrance 111 or 112.

In addition, the insert part 210 of the second separator 200 is formed along the major axis of the second separator 200, so that the first end with respect to the major axis has an extension part 212 that is bent while extending integrally with the main body of the second separator 200, and the second end has a spacing part 211 that is spaced apart from the main body of the second separator 200. Thus, the cross-section of the insert part 210 formed on the second separator 200 has an approximately "L" shape. In the outer circumference of the second separator 200, i.e. among four sides of the second separator 200, two sides other than sides on which the extension part 212 and the spacing part 211 are formed are spaced apart from the main body of the second separator 200, similarly to the spacing part 211.

The assembled state of the first separator 100 and the second separator 200 configured as described above will be described with reference to drawings.

Figure 7:
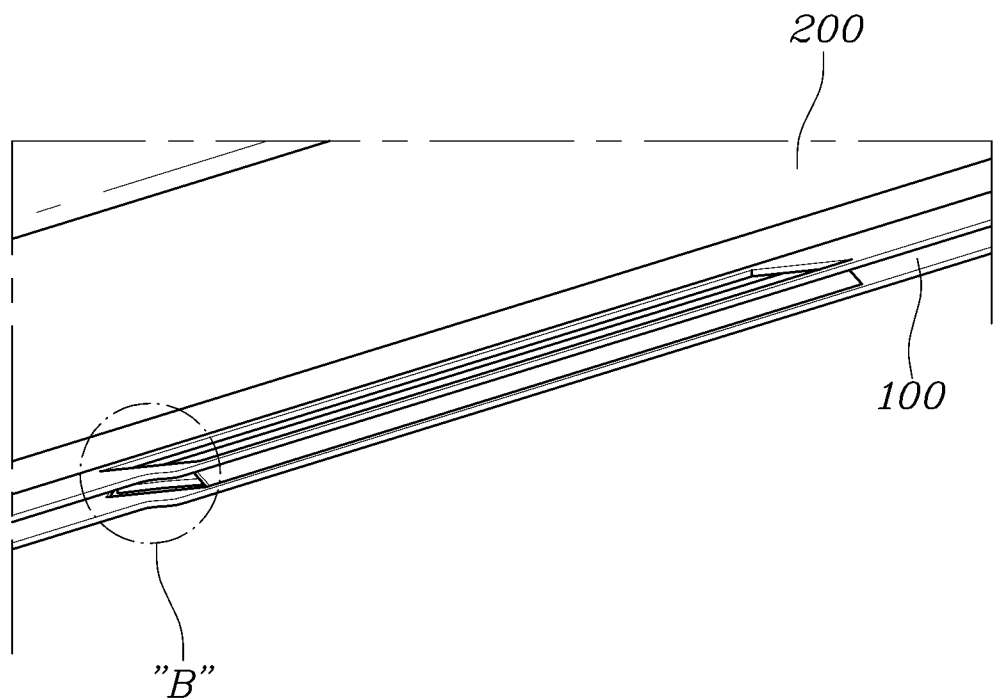
FIG. 7 is a diagram illustrating the assembled state of the separator assembly for the fuel cell in accordance with an embodiment of the present invention.
Figure 8:
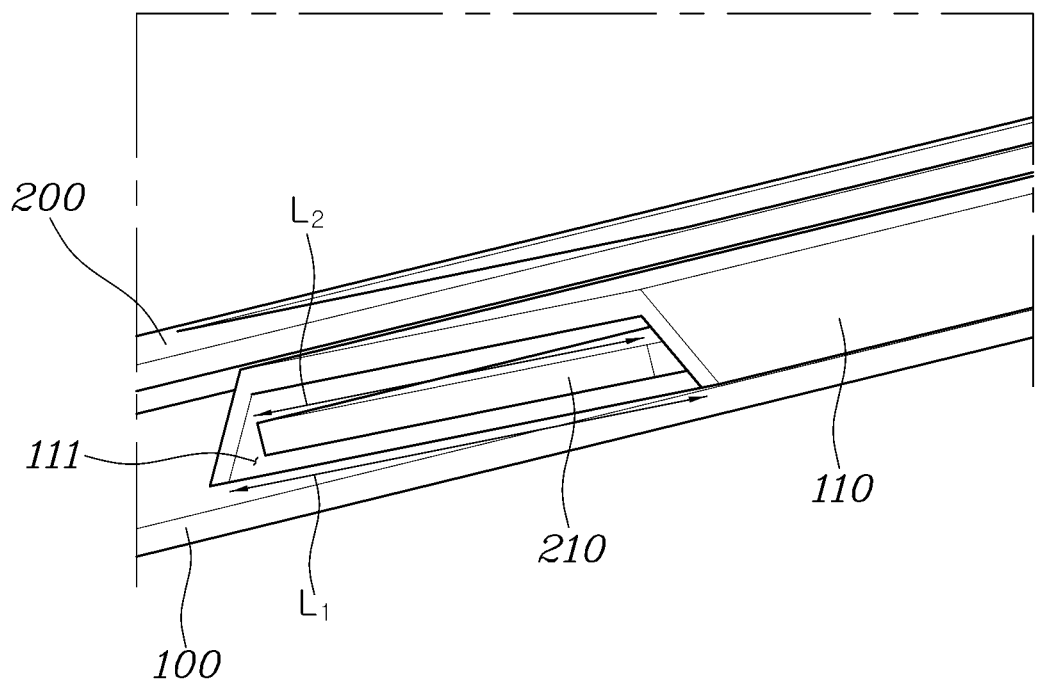
FIG. 8 is an enlarged view of portion "B" of FIG. 7.

FIG. 7 is a diagram illustrating the assembled state of the separator assembly for the fuel cell in accordance with an embodiment of the present invention, and FIG. 8 is an enlarged view of portion "B" of FIG. 7.

As shown in the drawings, in a state where the spacing part 211 of the insert part 210 formed on the second separator 200 is inserted into the second entrance 112 of the fastening part 110 formed on the first separator 100, the second separator 200 is moved along the major axis. Thus, when the extension part 212 of the insert part 210 formed on the second separator 200 comes into contact with the second entrance 112 of the fastening part 110 formed on the first separator 100, the assembly is completed while the spacing part 211 of the insert part 210 formed on the second separator 200 is located in the first entrance in of the fastening part 110 formed on the first separator 100, as shown in FIG. 8.

Meanwhile, a direction in which the fastening part 110 formed on the first separator 100 and the insert part 210 formed on the second separator 200 are fastened may be changed in various ways to facilitate the fastening process of the first separator 100 and the second separator 200 or to increase the fastening force of the first separator 100 and the second separator 200.

Figure 9:
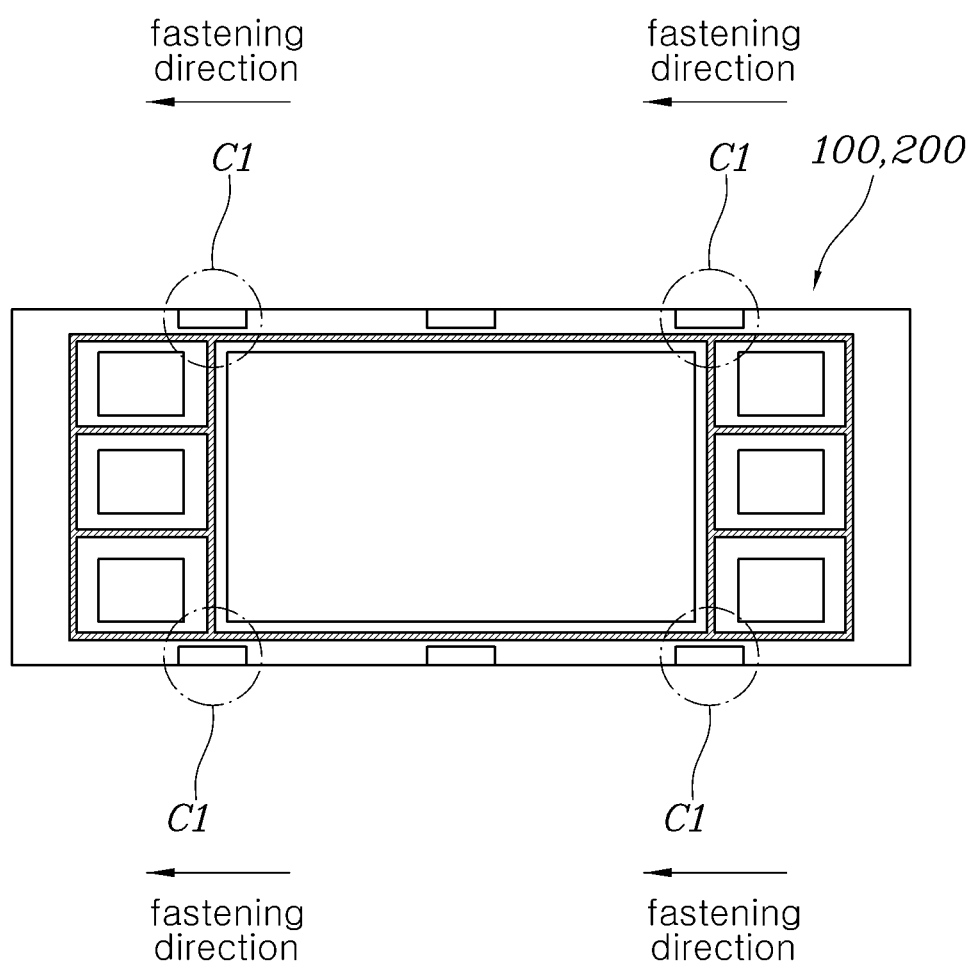
FIGS. 9 and 10 are diagrams illustrating the fastening direction of the separator assembly for the fuel cell in accordance with an embodiment of the present invention.
Figure 10:
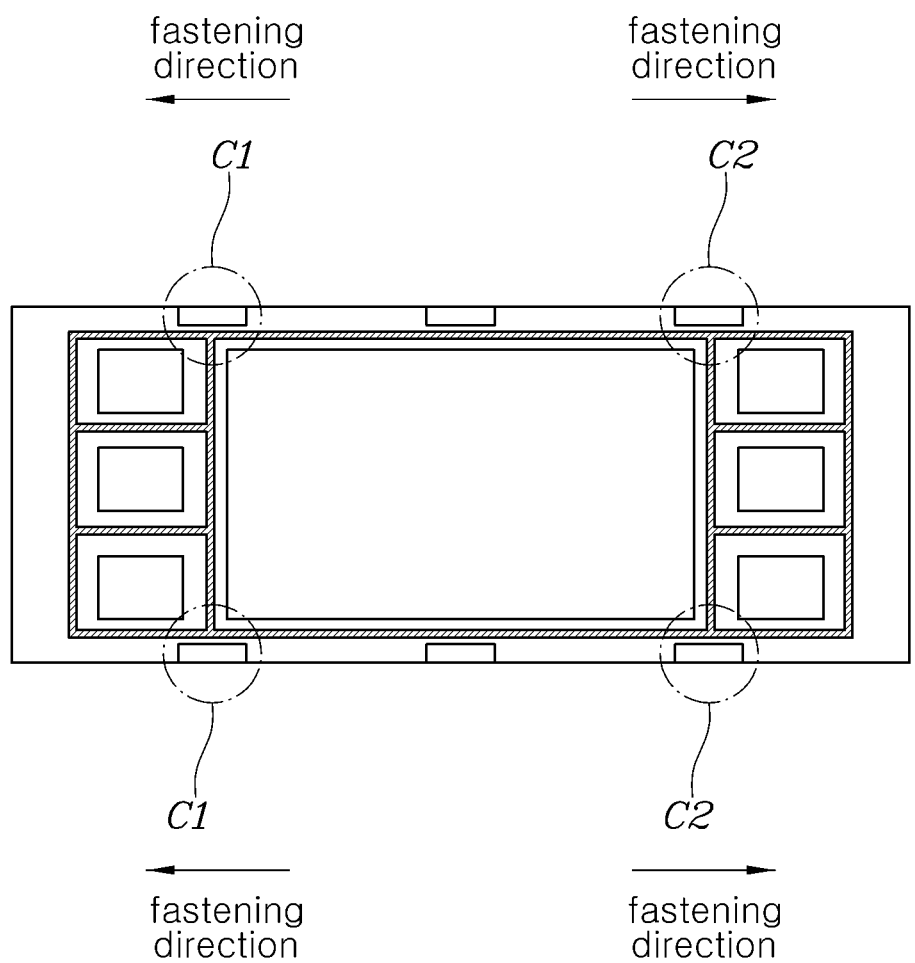

FIGS. 9 and 10 are diagrams illustrating the fastening direction of the separator assembly for the fuel cell in accordance with an embodiment of the present invention.

As shown in FIG. 9, it is possible to facilitate the fastening process of the first separator 100 and the second separator 200 by setting the directions of the insert parts 210 inserted into the fastening parts 110 on the same major axis to the same direction.

Here, the spacing parts 211 and the extension parts 212 of the insert parts 210 formed on the same major axis in the second separator 200 are formed in the same direction. Thus, the fastening parts 110 and the insert parts 210 are assembled in the same direction at a plurality of assembly points C1 where they are fastened to each other.

Thus, as shown in FIG. 9, a plurality of insert parts 210 may be assembled with a plurality of fastening parts 110 by a single operation at the plurality of assembly points C1.

Meanwhile, as shown in FIG. 10, the fastening force of the first separator 100 and the second separator 200 may be increased by setting the directions of the insert parts 210 inserted into the fastening parts 110 on the same major axis to opposite directions.

Here, the spacing parts 211 and the extension parts 212 of the insert parts 210 formed on the same major axis in the second separator 200 are formed in opposite directions. Thus, the fastening parts 110 and the insert parts 210 are assembled in the opposite directions at assembly points where they are fastened to each other, i.e. at assembly points C1 and C2 shown in FIG. 10.

As shown in FIG. 10, in order to assemble the fastening parts and the insert parts in the opposite directions at the assembly points C1 and C2, first, the insert part 210 is inserted into the fastening part 110 at the assembly point C1. Subsequently, the second separator 200 is bent along the major axis using the elasticity of the second separator 200, and then the insert part 210 is inserted into the fastening part 110 at the assembly point C2.

Meanwhile, when the first separator 100 and the second separator 200 are assembled with each other, the assembly direction is not limited to the major-axis direction. By changing the shape of the fastening part 110 and the insert part 210, the first separator 100 and the second separator 200 may be assembled along a minor axis.

Figure 11:
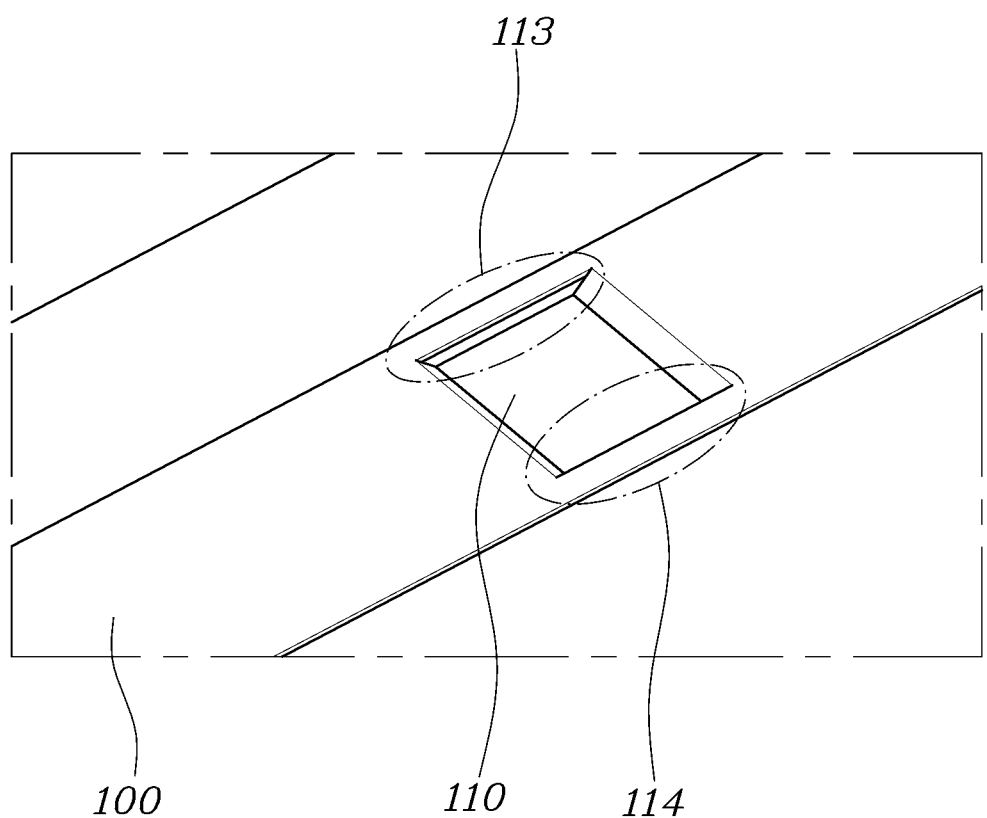
FIG. 11 is a diagram illustrating a first separator of a separator assembly for a fuel cell in accordance with another embodiment of the present invention.
Figure 12:
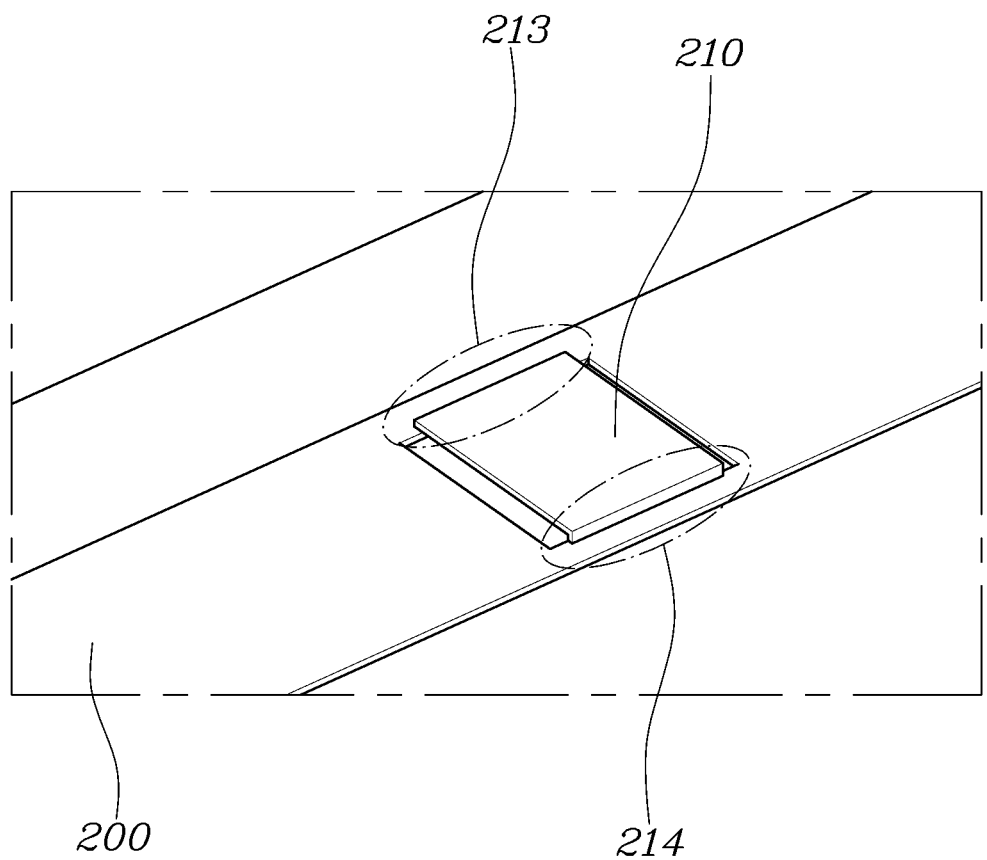
FIG. 12 is a diagram illustrating a second separator of the separator assembly for the fuel cell in accordance with another embodiment of the present invention.

FIG. 11 is a diagram illustrating a first separator of a separator assembly for a fuel cell in accordance with another embodiment of the present invention, and FIG. 12 is a diagram illustrating a second separator of the separator assembly for the fuel cell in accordance with another embodiment of the present invention.

As shown in FIG. 11, the fastening part 110 of the first separator 100 is formed along the minor axis of the first separator 100, so that a third entrance 113 is formed on a first end with respect to the minor axis, and a fourth entrance 114 is formed on a second end with respect to the minor axis. Thus, the third entrance 113 and the fourth entrance 114 communicate with each other.

Furthermore, as shown in FIG. 12, the insert part 210 of the second separator 200 is formed along the minor axis of the second separator 200, so that the first end with respect to the minor axis has an extension part 214 that is bent while extending integrally with the main body of the second separator 200, and the second end has a spacing part 213 that is spaced apart from the main body of the second separator 200. Likewise, the cross-section of the insert part 210 formed on the second separator 200 has an approximately "L" shape.

Furthermore, it is possible to facilitate the fastening process of the first separator 100 and the second separator 200 or to increase the fastening force of the first separator 100 and the second separator 200 by variously changing the fastening direction of the fastening parts 110 formed on the first separator 100 and the insert parts 210 formed on the second separator 200, in the first separator 100 and the second separator 200 assembled along the minor axis.

Figure 13:
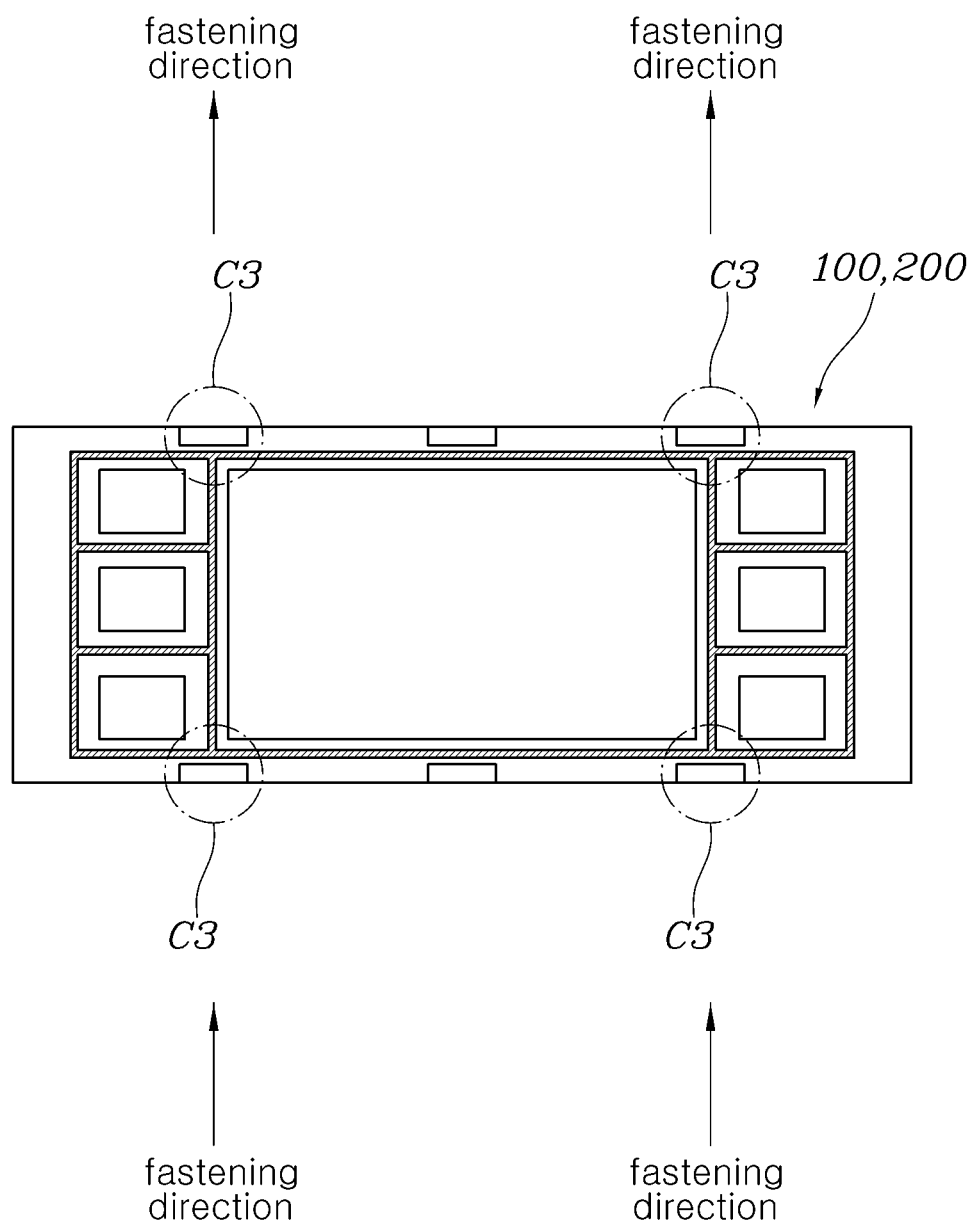

FIGS. 13 and 14 are diagrams illustrating the fastening direction of the separator assembly for the fuel cell in accordance with another embodiment of the present invention.

As shown in FIG. 13, it is possible to facilitate the fastening process of the first separator 100 and the second separator 200 by setting the directions of the insert parts 210 inserted into the fastening parts 110 on the same minor axis to the same direction.

Here, the spacing parts 213 and the extension parts 214 of the insert parts 210 formed on the same minor axis in the second separator 200 are formed in the same direction. Thus, the fastening parts 110 and the insert parts 210 are assembled in the same direction at a plurality of assembly points C3 where they are fastened to each other.

Thus, as shown in FIG. 13, a plurality of insert parts 210 may be assembled with a plurality of fastening parts 110 by a single operation at the plurality of assembly points C3.

Meanwhile, as shown in FIG. 14, the fastening force of the first separator 100 and the second separator 200 may be increased by setting the directions of the insert parts 210 inserted into the fastening parts 110 on the same minor axis to opposite directions.

Here, the spacing parts 211 and the extension parts 212 of the insert parts 210 formed on the same minor axis in the second separator 200 are formed in opposite directions. Thus, the fastening parts 110 and the insert parts 210 are assembled in the opposite directions at assembly points where they are fastened to each other, i.e. at assembly points C3 and C4 shown in FIG. 14.

As shown in FIG. 14, in order to assemble the fastening parts and the insert parts in the opposite directions at the assembly points C3 and C4, first, the insert part 210 is inserted into the fastening part 110 at the assembly point C3. Subsequently, the second separator 200 is bent along the minor axis using the elasticity of the second separator 200, and then the insert part 210 is inserted into the fastening part 110 at the assembly point C4.

Meanwhile, in order to firmly assemble the first separator 100 and the second separator 200, it is preferable that the fastening parts 110 of the first separator 100 are formed on at least two points of the opposite edges with respect to the minor axis of the first separator 100, and the insert parts 210 of the second separator 200 are formed to correspond to points where the fastening parts 110 are formed.

Thus, the fastening parts 110 formed on the first separator 100 and the insert parts 210 formed on the second separator 200 are preferably formed, respectively, on at least four points.

Although the present invention was described with reference to specific embodiments shown in the drawings, it is apparent to those skilled in the art that the present invention may be changed and modified in various ways without departing from the scope of the present invention, which is described in the following claims.

What is claimed is:

1. A separator assembly for a fuel cell, the separator assembly comprising:
   a first separator having tunnel-shaped fastening parts formed on a plurality of points of an edge area thereof; and
   a second separator having insert parts formed at positions corresponding to each of the fastening parts of the first separator on an edge area thereof to be inserted into the fastening parts, wherein the insert parts of the second separator are inserted into the fastening parts of the first separator to assemble the first separator and the second separator.

2. The separator assembly of claim 1, wherein one of the fastening parts of the first separator protrudes to be bent in a direction facing the second separator, and the opposite end of the one of the fastening parts is opened to form an entrance.

3. The separator assembly of claim 2, wherein a corresponding one of the insert parts of the second separator protrudes to be bent in a direction facing the first separator and extends to be inserted into the entrance.

4. The separator assembly of claim 1, wherein one of the fastening parts of the first separator is formed along a major axis of the first separator so that a pair of entrances is formed on opposite ends along the major axis, the pair of entrances being configured to communicate with each other.

5. The separator assembly of claim 4, wherein a corresponding one of the insert parts of the second separator is formed along a major axis of the second separator so that a first end with respect to the major axis has an extension part that is bent while extending integrally with a main body of the second separator and a second end has a spacing part that is spaced apart from the main body of the second separator, the insert part being inserted into the entrance of the corresponding fastening part through the spacing part.

6. The separator assembly of claim 1, wherein one of the fastening parts of the first separator is formed along a minor axis of the first separator so that a pair of entrances is formed on opposite ends along the minor axis, the pair of entrances being configured to communicate with each other.

7. The separator assembly of claim 6, wherein a corresponding one of the insert parts of the second separator is formed along a minor axis of the second separator so that a first end with respect to the minor axis has an extension part that is bent while extending integrally with a main body of the second separator and a second end has a spacing part that is spaced apart from the main body of the second separator, the insert part being inserted into the entrance of the corresponding fastening part through the spacing part.

8. The separator assembly of claim 1, wherein:
the fastening parts of the first separator are formed on each of at least two points of opposite edges with respect to a minor axis of the first separator; and
the insert parts of the second separator are formed to correspond to the points where the fastening parts are formed.

9. The separator assembly of claim 8, wherein the insert parts inserted into the fastening parts on the same major axis are arranged in the same direction.

10. The separator assembly of claim 8, wherein the insert parts inserted into the fastening parts on the same major axis are arranged in opposite directions.

11. The separator assembly of claim 8, wherein the insert parts inserted into the fastening parts on the same minor axis are arranged in the same direction.

12. The separator assembly of claim 8, wherein the insert parts inserted into the fastening parts on the same minor axis are arranged in opposite directions.

13. A separator assembly for a fuel cell, the separator assembly comprising:
a first separator having opposite first and second edges at ends of a major axis of the separator assembly and opposite third and fourth at edges of a minor axis of the separator assembly, the first separator including a first tunnel-shaped fastening part extending from the first edge to the second edge and a second tunnel-shaped fastening part extending from the third edge to the fourth edge; and
a second separator having opposite first and second edges at ends of the major axis of the separator assembly and opposite third and fourth at ends of the minor axis of the separator assembly, the second separator including a first insert part formed at a position corresponding to a first end of the first fastening part, a second insert part formed at a position corresponding to a second end of the first fastening part, a third insert part formed at a position corresponding to a first end of the second fastening part, and a fourth insert part formed at a position corresponding to a second end of the second fastening part, wherein each insert part of the second separator is inserted into the corresponding fastening parts of the first separator.

14. The separator assembly of claim 13, wherein the first and second insert parts are arranged in the same direction.

15. The separator assembly of claim 13, wherein the first and second insert parts are arranged in opposite directions.

16. A fuel cell stack comprising:
a plurality of fuel cells stacked on each other, each fuel cell comprising a membrane electrode assembly, a pair of gas diffusion layers, a first separator, and a second separator;
tunnel-shaped fastening parts formed in a plurality of points on an edge area of the first separator; and
insert parts formed at positions corresponding to the fastening parts of the first separator on an edge area of the second separator to be inserted into the fastening parts, wherein the insert parts of the second separator are inserted into the fastening parts of the first separator to assemble the first separator and the second separator.

17. The fuel cell stack of claim 16, wherein:
one of the fastening parts of the first separator protrudes to be bent in a direction facing the second separator;
an opposite end of the one of the fastening parts is opened to form an entrance; and
a corresponding one of the insert parts of the second separator protrudes to be bent in a direction facing the first separator and extends to be inserted into the entrance.

18. The fuel cell stack of claim 16, wherein:
one of the fastening parts of the first separator is formed along a major axis of the first separator so that a pair of entrances is formed on opposite ends along the major axis;
a corresponding one of the insert parts of the second separator is formed along a major axis of the second separator so that a first end with respect to the major axis has an extension part that is bent while extending integrally with a main body of the second separator and a second end has a spacing part that is spaced apart from the main body of the second separator; and
for each end, the insert part is inserted into the entrance of the corresponding fastening part through the spacing part.

19. The fuel cell stack of claim 16, wherein:
one of the fastening parts of the first separator is formed along a minor axis of the first separator so that a pair of entrances is formed on opposite ends along the minor axis;
a corresponding one of the insert parts of the second separator is formed along a minor axis of the second separator so that a first end with respect to the minor axis has an extension part that is bent while extending integrally with a main body of the second separator and a second end has a spacing part that is spaced apart from the main body of the second separator; and for each end, the insert part is inserted into the entrance of the corresponding fastening part through the spacing part.

20. The fuel cell stack of claim 16, wherein:

the fastening parts of the first separator are formed on each of at least two points of opposite edges with respect to a minor axis of the first separator; and the insert parts of the second separator are formed to correspond to the points where the fastening parts are formed.

\* \* \* \* \*